United States Patent [19]

Westley

[11] 4,010,818

[45] Mar. 8, 1977

[54] FLEXIBLE NOISE BARRIER MATERIAL

[75] Inventor: Melvin W. Westley, Trumbull, Conn.

[73] Assignee: E. I. Du Pont de Nemours and Company, Wilmington, Del.

[22] Filed: June 10, 1975

[21] Appl. No.: 585,589

[52] U.S. Cl. .............................. 181/33 G; 428/242; 428/287

[51] Int. Cl.[2] .................... F04B 1/99; G10K 11/04; B32B 19/02

[58] Field of Search ......... 181/33 G; 428/285, 286, 428/287, 216

[56] References Cited

UNITED STATES PATENTS

| | | | |
|---|---|---|---|
| 3,051,260 | 8/1962 | Eckel | 181/33 G |
| 3,056,707 | 10/1962 | Helbing et al. | 181/33 G |
| 3,061,491 | 10/1962 | Sherrard et al. | 181/33 G |
| 3,160,549 | 12/1964 | Caldwell et al. | 181/33 G |
| 3,273,297 | 9/1966 | Weky, Jr. | 181/33 G |
| 3,652,360 | 3/1972 | Hartman et al. | 181/33 G |
| 3,667,175 | 6/1972 | Bjorksten | 181/33 G |
| 3,895,143 | 7/1975 | Tarlow | 181/33 G |

*Primary Examiner*—Stephen J. Tomsky

[57] ABSTRACT

A flexible noise barrier material is provided. The barrier material consists of a mass building coat adhered to a non-woven substrate. The mass building coat consists of neoprene and dispersed particles of iron sulfide, iron oxide, barium sulfate, or barium oxide.

8 Claims, No Drawings

FLEXIBLE NOISE BARRIER MATERIAL

FIELD OF THE INVENTION

The present invention relates to a flexible noise barrier material.

PRIOR ART

There exists a need for more varieties of inexpensive, stable, flexible, low bulk noise barrier materials having good tensile strength and durability which are capable of substantially reducing sound transmission through air.

There are four basic ways to control sound transmission; they are: stop it with barriers, absorb it with absorption materials, isolate the source of the sound, and dampen it with dampening materials.

Walls, barriers, and enclosures erected around the noise source will reduce sound transmission through the air.

A limp, flexible, or non-resonating material is the material of choice for these walls, barriers, and enclosures.

Known materials useful as barriers include lead, lead vinyl, high-mass filled flexible vinyl, rubber, and neoprene.

A known laminate useful as a noise barrier material is disclosed in U.S. Pat. No. 3,061,491, granted to Sherrard and Khachadoorian, on Oct. 30, 1967. This patent discloses basically a laminate consisting of 1. a substrate of any natural or synthetic fiber, either woven or non-woven, and
2. a mass building coat containing a finely-divided metal material having a density of at least 8 in a plastisol.

Illustrative of a plastisol are polyvinyl halide and vinyl acetate. Illustrative of typical high density metals are lead, mercury, platinum, gold, iridium, and rhodium.

It has been discovered that a mass building coat consisting of finely-divided particles of iron oxide, iron sulfide, barium sulfate, or barium oxide and a neoprene composition laminated to a non-woven sheet structure provides greater sound reduction than the known material.

SUMMARY OF THE INVENTION

According to the present invention there is provided a flexible, high density, low bulk, coated barrier material capable of reducing sound transmission through air; the barrier material consists essentially of:

1. a non-woven sheet structure based on continuous filament synthetic organic fiber,
2. an adhesive coat applied to the sheet structure,
3. a mass building coat comprised of neoprene and a dispersed metal compound selected from the group consisting of iron sulfide, iron oxide, barium oxide, and barium sulfate; the mass building coat is applied to the adhesive coated sheet structure.

DETAILED DESCRIPTION OF THE INVENTION

Sheet structures based on continuous filament synthetic organic fiber are well known in the art. An example of such a structure is disclosed in U.S. Pat. No. 3,341,394, issued to G. A. Kinney on Sept. 12, 1967; this patent is hereby incorporated by reference.

The sheet structure is a non-woven material which is either spun bond, mechanically bond, or resin bond.

The non-woven material consists of more than one type of fiber, i.e., a binder fiber and a structure fiber. These fibers melt at different temperatures. Binder fibers may consist of continuous filament of a similar chemical nature to the structural filament element but having a lower melting temperature. In one mode of operation, the binder filament may be of the same chemical composition as the structural filaments but spun with a lower level of orientation or with no orientation. In a second mode of operation, the co-spun binder filaments may be highly oriented but may be of a copolymeric nature or have some other modification which provides a lower melting temperature than the structural filament. Preferred fibers are polyester and polypropylene. Preferred binder fibers for use with poly(hexamethylene adipamide) include polycaproamide filaments or copolymers, melt blends, etc., thereof with poly(hexamethylene adipamide). Preferred binder fibers for use with poly(ethylene terephthalate) include the isophthalate and hexahydroterephthalate copolymers thereof.

The non-woven material useful in this invention must be capable of supporting the mass building coat. A preferred non-woven material weighs 2.5 ounces or more per square yard and has a thickness of 17 or more mils. A more preferred non-woven material weighs 5.0 ounces or more per square yard and has a thickness of 28 or more mils.

The mass building coat consists of finely-divided particles or iron oxide, iron sulfide, barium sulfate, or barium oxide, and a neoprene composition.

Neoprene is the generic name for synthetic rubber made by polymerization of 2-chloro-1,3-butadiene.

Neoprene is utilized because it is flame resistant and flexible.

The finely-divided particles have a particle size range of 1–100 micron, preferably 15–45 micron, as measured by sedimentation.

These compounds, i.e., iron oxide, iron sulfide, barium oxide, and barium sulfate, have densities of less than 6 grams per milliliter. They are utilized because they are inexpensive and of sufficient density.

The concentration of the particles in the mass building coat is about 30–70% based on the total weight of the mass building coat, 40–60% is preferred, 45–55% is more preferred.

The particle filled neoprene composition can contain adjuncts such as a precessing oil, curing agent, antioxidant, tackifier, and strengthener.

The preferred product will use an adhesive composition to adhere the mass building coat to the non-woven sheet. Advantageously, the adhesive composition is comprised of a resin system which is compatible with the mass building coat; preferably, the adhesive composition will be a neoprene composition.

The preferred noise barrier material will weigh about 134–154 ounces per square yard, have a grab strength measured by ASTM-D-751 of at least 200 pounds X 160 pounds warp X fill, have a strip tear strength measured by ASTM-D-751 of at least 7 pounds by 7 pounds warp X fill, and not support combustion as measured by Method 5910 of Federal Test Standard No. 191.

The noise barrier material can be made by coating the non-woven sheet with the adhesive composition and then calendering the mass building coat upon the adhesive-coated substrate. The mass building coat is doctored to obtain the desired weight and thickness.

The following example is illustrative of the invention. All parts are by weight unless otherwise indicated.

EXAMPLE

A spunwoven polyester sheet weighing 6 ounces per square yard and having a thickness of 30 mils (Reemay 2470 sold by E. I. du Pont de Nemours and Company) is coated on both sides with about 2.7 ounces per square yard of a neoprene adhesive composition comprising the formulation:

| | |
|---|---|
| neoprene | 100.00 parts by weight |
| paracoumarone indene resin | 4.10 parts by weight |
| carbon black | 3.30 parts by weight |
| calcium carbonate | 21.60 parts by weight |
| terpenic oils and resins blend | 3.30 parts by weight |
| piperindium pentamethylene dithiocarbonate | .50 parts by weight |
| 2,2'-di thio bis (benzo thiazole) | .30 parts by weight |
| zinc oxide | 5.00 parts by weight |
| magnesium oxide | 4.20 parts by weight |
| phenyl-beta-naphthylamine | 1.70 parts by weight |
| toluene | 300.00 parts by weight |

The adhesive coated sheet is heated to 95° C. and then cooled to room temperature.

The adhesive coated sheet is coated on both sides with about 67 ounces per square yard of a barium sulfate filled neoprene composition to produce a coated sheet having a total thickness of 122 mils. The composition of the barium sulfate filled neoprene composition is as follows:

| | |
|---|---|
| neoprene | 100.00 parts by weight |
| paracoumarone indene resin | 4.10 parts by weight |
| carbon black | 64.80 parts by weight |
| barium sulfate | 100.00 parts by weight |
| circo oil (a petroleum fraction of process oil) | 5.90 parts by weight |
| polymerized vegetable oil | 38.00 parts by weight |
| stearic acid | 1.00 parts by weight |
| zinc oxide | 5.10 parts by weight |
| magnesium oxide | 4.10 parts by weight |
| phenyl-beta-naphthylamine | 2.10 parts by weight |
| calcium stearate | .80 parts by weight |
| mixed dixylyl disulfides | .50 parts by weight |

The product is cured for 5 hours at 128° C. and subsequently cooled.

The product has the following properties:

| | |
|---|---|
| Weight, ounces/square yard | 144 |
| Tensile strength, grab, warp × fill | 287 lbs. × 160 lbs. |
| Tear, strip, warp × fill | 12.7 lbs. × 7 lbs. |
| Adhesion | 4.6 lbs. per inch |

-continued

| | |
|---|---|
| Burst Strength | 327 lbs. per square inch |
| Flame resistance Test - Method 5910 of Federal Test Standard No. 191 | Not Combustible |

The product has excellent noise transmission reducing properties.

I claim:

1. A flexible barrier material capable of reducing sound transmission through air; the barrier material comprising:
   a. a non-woven sheet structure based on continuous filament synthetic organic fiber of polyester and polypropylene,
   b. a neoprene composition adhesive coat applied to the sheet structure, and
   c. a mass building coat comprised of, neoprene and dispersed particles of a metal compound, having a density of less than 6 grams per milliliter, selected from the group consisting of iron sulfide, iron oxide, barium oxide, and barium sulfate; wherein the mass building coat is applied upon the adhesive coated sheet structure.

2. The barrier material of claim 1, wherein the non-woven sheet structure weighs 2.5 or more ounces per square yard and has a thickness of 17 or more mils.

3. The barrier material of claim 1, wherein the non-woven sheet structure weighs 5.0 or more ounces per square yard and has a thickness of 28 or more mils.

4. The barrier material of claim 1, wherein, the dispersed particles have a particle size range of 15–45 microns.

5. The barrier material of claim 1, wherein the mass building coat is comprised of 40–60% by weight, based on the total weight of mass building coat, of dispersed particles.

6. The barrier material of claim 5, wherein the dispersed particles are barium sulfate.

7. The barrier material of claim 1, wherein the barrier materials weigh about 134–154 ounces per square yard, has a grab strength of at least 200 pounds X 160 pounds warp X fill as measured by ASTM-D-751; has a strip tear strength of at least 7 pounds by 7 pounds warp X fill as measured by ASTM-D-751, and does not support combustion as measured by Method 5910 of Federal Test Standard No. 191.

8. The barrier material of claim 7, wherein the barrier material is comprised of
   a. a non-woven sheet structure consisting of fibers of polyester and polypropylene, and weighing 5.0 or more ounces per square yard and having a thickness of 28 or more mils;
   b. an adhesive coat consisting of a neoprene composition; and
   c. a mass building coat consisting of a composition of neoprene and dispersed particles of barium sulfate, wherein the barium sulfate comprises 40–60% of weight of the mass building coat and wherein the dispersed particles have a particle size range of 15–45 microns.

* * * * *